United States Patent [19]

Nishimura

[11] Patent Number: 5,270,810
[45] Date of Patent: Dec. 14, 1993

[54] STILL IMAGE CONTROL IN AN ELECTRONIC ENDOSCOPE

[75] Inventor: Shigeru Nishimura, Omiya, Japan

[73] Assignee: Fuji Photo Optical Co., Ltd., Omiya, Japan

[21] Appl. No.: 834,214

[22] Filed: Feb. 12, 1992

[30] Foreign Application Priority Data

Feb. 14, 1991 [JP] Japan .................. 3-040759

[51] Int. Cl.[5] .............................................. H04N 5/21
[52] U.S. Cl. ...................................... 358/98; 358/167
[58] Field of Search .................... 358/98, 105, 167, 36

[56] References Cited

U.S. PATENT DOCUMENTS

| | | | |
|---|---|---|---|
| 4,901,143 | 2/1990 | Uehara et al. | 358/105 X |
| 4,933,757 | 6/1990 | Kanno et al. | 358/98 |
| 4,933,758 | 6/1990 | Saito et al. | 358/98 |
| 4,933,760 | 6/1990 | Yamashita et al. | 358/105 |
| 5,032,913 | 7/1991 | Hattori et al. | 358/98 |
| 5,034,888 | 7/1991 | Uehara et al. | 358/98 X |
| 5,164,824 | 11/1992 | Ieoka et al. | 358/98 |

FOREIGN PATENT DOCUMENTS 1-86106 3/1989 Japan ...................... 358/98

Primary Examiner—Mark R. Powell
Attorney, Agent, or Firm—Oblon, Spivak, McClelland, Maier & Neustadt

[57] ABSTRACT

An electronic endoscope, having an electronic circuitry arranged to apply output signals of a solid-state image sensor to a processor, to store sequentially obtained picture data of a subject in an image memory means after predetermined signal processing, and to read out a plural number of picture data from the image memory means to produce simultaneous video signal, while providing a still image memory means parallel with the image memory means, along with a switch means for selectively supplying the signals from the image memory means or from the still image memory means as output signals. Further, the electronic circuitry includes a noise reducer incorporating a motion detector and located on the output side of the image memory means, and a still image control means adapted to detect deviations in color signal on the basis of output signals of the motion detector of the noise reducer and to renew the data in the still image memory means each time when no color deviation is detected in the picture signals from the solid-state image sensor.

3 Claims, 2 Drawing Sheets

STILL IMAGE CONTROL IN AN ELECTRONIC ENDOSCOPE

BACKGROUND OF THE INVENTION

1. Field of the Art

This invention relates to an electronic endoscope suitable for use in medical and industrial fields, and more particularly to an electronic endoscope capable of producing a vivid freeze-picture image of a subject under observation through a solid-state image sensor driven by a sequential color scan system.

2. Description of the Prior Art

As well known in the art, electronic endoscopes have a solid-state image sensor like CCD mounted at the tip end of an insert or catheter member to be introduced, for example, into an intracavitary portion of interest, and, for reducing the diameter of the insert member, generally employ a single-element solid-state image sensor. From the standpoint of improving the resolution, the solid-state image sensor element is driven, for example, by a sequential color scan system to sequentially obtain picture data of R (red), G (green) and B (blue), and these tricolor picture data are processed to produce a color picture image of the subject. In addition to observation of motion video images of a subject, it is often the case that arrangements are made to produce still picture images of a subject for display on a monitor or for hard-copying or for recording on an external memory medium such as video tape, magnetic disk, optical disk and so forth. In order to obtain a still picture image or a freeze-image, electronic endoscopes are usually provided with a freeze control mechanism, including a freeze button which is mounted on a manual operating section of each endoscope for manipulation by an operator's finger when it is desired to freeze the picture image.

In this regard, in order to obtain a complete picture image of a subject, it is necessary to mix a plural number of sequentially varying picture data (the RGB tricolor picture data in case of field picture, and the six picture data consisting of RGB picture data of odd- and even-number fields in case of frame picture). Aside from the display of motion-picture images, the production of a still picture image has a problem that a relative movement between a subject and a solid-state image sensor element on the insert member of the endoscope often results in an obscure picture image of low resolution due to deviations of color signals. Therefore, in order to pick up a sharp freeze-picture image free of color deviations, it has been the general practice to detect motions of a subject on the basis of the picture images sequentially picked up through the solid-state image sensor element, and to freeze the picture image only when a still state of the subject is detected by a motion sensor circuit, without immediately responding to a freeze control signal. More specifically, in processing signals from a solid-state image sensor, the obtained picture data are fed to a motion sensor circuit before A/D conversion, thereby to detect a motion of a subject by comparing the picture data of successive fields (or frames), e.g., detecting a difference in contour or other picture elements by comparing a real-time signal of R color data with preceding R color data, namely, with a corresponding R signal of three fields before. When the subject is found to be in a still state or to be only in a slight motion which would not cause deviations of color signal, the data renewal of picture memory circuit is inhibited and the picture data of this state is displayed on a monitor as a freeze-picture image.

As explained above, it has been difficult to obtain a freeze-picture image immediately in response to manipulation of a freeze control button, which only starts the operation of the motion detection circuit. Namely, a freeze-picture image is displayed at a time point when a subject is found to be in a still state after manipulation of the freeze button, in some cases letting a relatively long time lapse before freezing the image. As a result, it is often the case that the resulting freeze-picture image is different from an originally intended one, failing to show the condition of particular locality of interest at the proper timing and, due to inferior response of the freeze-picture control, necessitating repetition the freeze operation until an optimum or satisfactory freezeimage is obtained.

SUMMARY OF THE INVENTION

In view of the foregoing situations, it is an object of the present invention to improve the operational response in image freeze control.

It is another object of the present invention to provide an electronic endoscope with a freeze control circuitry of simple arrangement which permits production of a desired freeze-picture image in a facilitated manner.

It is a further object of the present invention to provide an electronic endoscope which is capable of producing a freeze-picture image of high quality by the use of simple circuitry utilizing a motion sensing function of a noise reducer which is originally provided for picture noise reduction.

In accordance with the present invention, there is provided, for achieving the above-stated objectives, an electronic endoscope, comprising: a solid-state image sensor driven by a sequential color scan system; a processor arranged to store picture data of a subject in a sequential/simultaneous conversion type image memory means after processing sequential picture signals from the solid-state image sensor through predetermined signal processing operations and to read out a plural number of picture data from the image memory to provide simultaneous video signal; a still image memory means provided parallel with the picture memory; a switch means for selectively supplying the signals from the image memory means or from the still image memory means as output signals; a noise reducer with a motion detector, located on the output side of the image memory means; and a still image control means adapted to detect deviations in color signal on the basis of output signals of the motion detector of the noise reducer and to renew the data in the still image memory means each time when no color deviation is detected.

The above and other objects, features, operational effects and merits of the invention will become apparent from the following description and the appended claims, taken in conjunction with the accompanying drawings.

BRIEF DESCRIPTION OF THE DRAWINGS

In the accompanying drawings

DESCRIPTION OF PREFERRED EMBODIMENTS

Hereafter, the invention is described more particularly by way of a preferred embodiment, with reference to the drawings.

Figure 1:
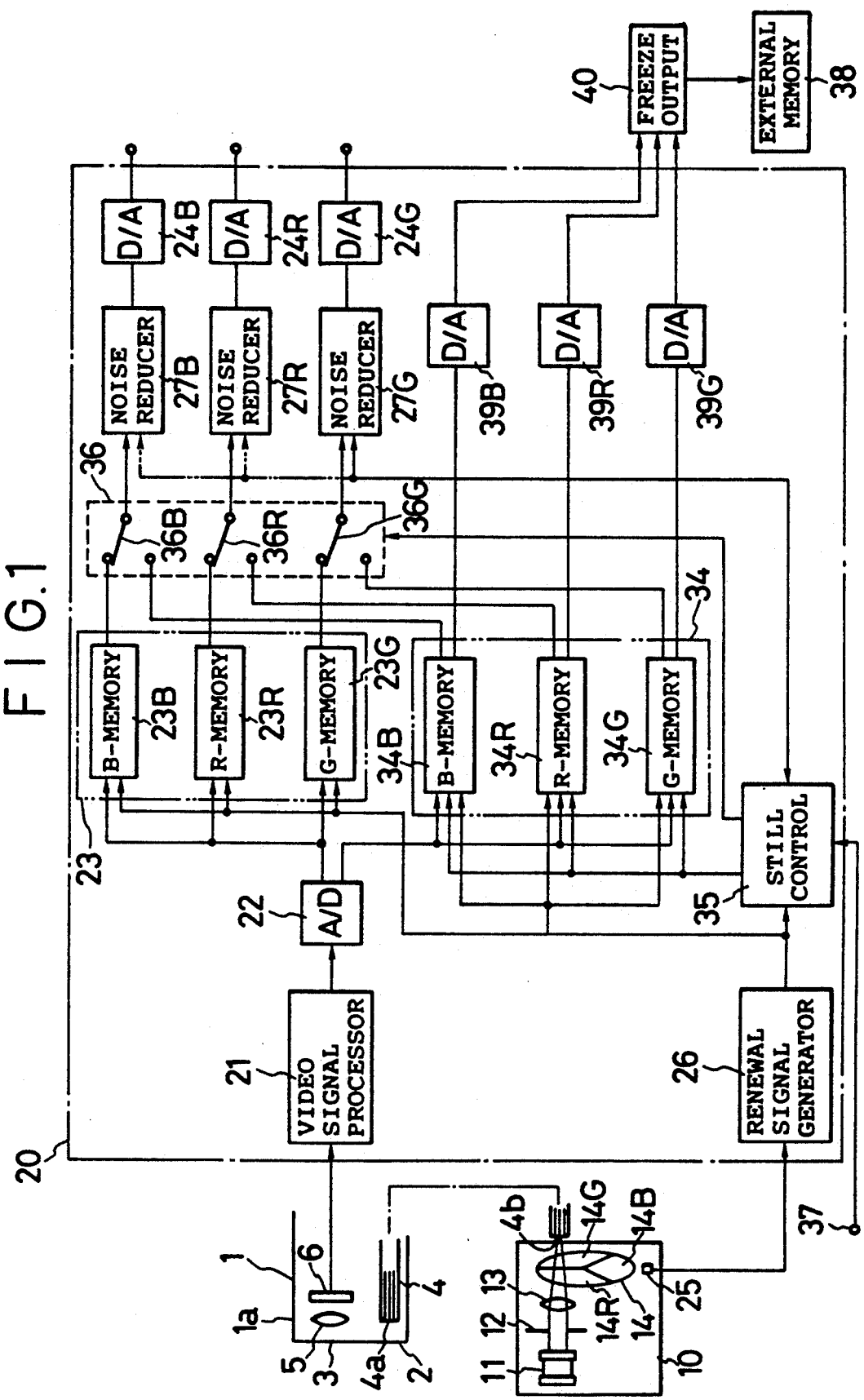
FIG. 1 is a circuit diagram of an electronic endoscope embodying the present invention.

Referring first to FIG. 1, the reference numerals 1, 10 and 20 indicate an endoscope, a light source and a processor, respectively. The endoscope 1 includes an insert member 1a to be introduced into an intracavitary portion of a patient or other internal portion to be examined. The insert member 1a is provided with an illumination light emitting sector 2 and an observation sector 3 at the distal end thereof. A light guide 4 has its light emitting end 4a disposed in the illumination light emitting sector 2, while an objective lens 5 is mounted in the observation sector 3 in association with a CCD 6 which is located in the imaging plane of the objective lens 5.

The other light receiving end of the light guide 4 is led into the light source 10 with a source lamp 11. Located successively between the source lamp 11 and the light receiving end 4b of the light guide 4 are a stop 12, a condenser lens 13 and a rotary color filter 14. The rotary color filter 14 is provided with a R-filter zone 14R, a G-filter zone 14G and a B-filter zone 14B which selectively transmit light of red, green and blue spectra, respectively, and which are separated from each other by an intervening light blocking zone. Accordingly, as the rotary color filter 14 is put in rotation, the light from the light guide 4 is successively passed through the respective RGB filter zones to irradiate a subject S with R, G and B light periodically and alternately with a blank period corresponding to the light blocking zone.

The signal charges which are accumulated in CCD 6 in the R, G and B irradiation periods are read out in the blank periods and fed to the processor 20 to undergo predetermined signal processing operations. Namely, the signals from CCD 6 are firstly fed to a video signal processing circuit 21 which performs known signal processing operations including signal clamping, blanking, gumma correction and so forth. Thereafter, the processed signals are digitized through an A/D converter 22, and field picture signals of the respective colors are stored in RGB memories 23R, 23G and 23B of a field memory circuit 23, respectively.

Each of the RGB field picture signals stored in the field memory circuit 23 is renewed with a fresh field picture signal which is input to into the field memory circuit 23. For example, the R field signal in the memory 23R is renewed when a next R field signal is input to the field memory circuit 23. Concurrently, previously stored G and B field picture signals in the field memory circuit 23 are read out along with the real-time R-field signal, which are then converted into analog signals through D/A converters 24R, 24G and 24B, respectively, and sent to a monitor device (not shown) in the form of simultaneous video signal to display a color picture image of the subject. For the purpose of controlling the rewriting and renewal of the contents of the respective memories 23R, 23G and 23B of the field memory circuit 23, the processor is provided with a sensor 25 thereby to detect which one of the filter zones 14R, 14G and 14B of the rotary color filter 14 is in the path of illuminating light. Enabling signal produced by the sensor 25 are supplied to a data renewing signal generator 26, and the contents of the memories 23R, 23G and 23B are each renewed in response to a control signal from the data renewing signal generator 26.

Further, for the purpose of improving the S/N ratio through reduction of noises in processing the output video signals of CCD 6 through the processor 20 prior to transfer to and display on the monitor device, the processor employs noise reducers 27R, 27G and 27B on the output side of the RGB memories 23R, 23G and 23B, respectively. In this instance, for reduction of noise components, these noise reducers 27R, 27G and 27B are adapted to add the output signal from the memory 23R, 23G or 23B to the corresponding picture signal of a preceding field to take an added mean value.

Figure 2:
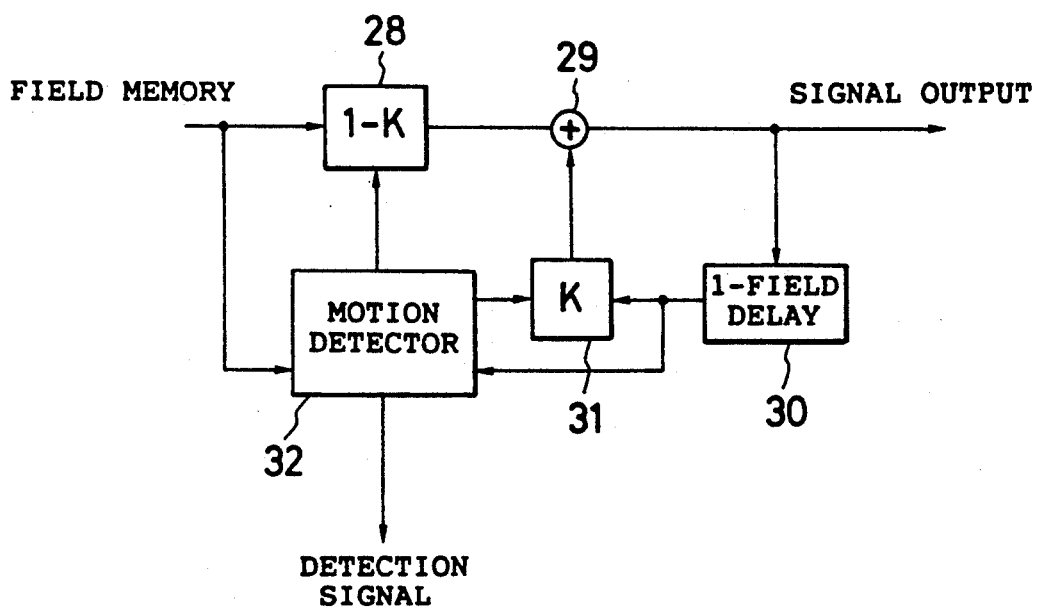
FIG. 2 is a circuit diagram of a noise reducer shown in FIG. 1.

In this regard, FIG. 2 shows the circuit arrangement of the noise reducers 27R, 27G and 27B, which are identical with each other in circuit arrangement. In the following description, a common reference numeral 27 is used for the respective noise reducers unless the description concerns a particular one or ones of the noise reducers. As clear from that figure, the noise reducer 27 is constituted by a cyclic digital filter, which is arranged to receive a picture signal (8-bit digital signal) from the field memory circuit, and to multiply the signal by (1-k) times at a first coefficient unit 28 before application to an adder 29. On the other hand, output signal from a one-field (or one-frame) delay circuit 30, which stores a picture signal of a preceding field, is multiplied by k times at a second coefficient unit 31 before application to the adder 29, which adds up the two signals. Accordingly, the noise component is reduced according to the correlation between the previous and current picture signals.

However, if there is a relative motion between the subject and the insert member 1a of the endoscope 1, the image resolution is deteriorated by blurring or degradation in definition. For this reason, it becomes necessary to increase the value of the coefficient k (max.=0.5) when the relative movement of a subject is zero or very small, and to minimize the value of k when the relative movement takes place in a more conspicuous degree. For detection of such relative movement of the subject, the output signal of the field memory circuit and the signal from the one-frame delay circuit 30 are applied to a motion detection means 32, which compares the two signals to find a motion of the subject from a difference in certain picture characteristics between the two signals, for example, from variations in edge positions of a picture element. Thus, the coefficient k is varied according to the output signal of the motion detection means 32.

Turning now to the circuit arrangement for producing a freeze-picture image, a still image memory circuit 34 is provided parallel with the field memory circuit 23, the still image memory circuit 34 being constituted by an R memory 34R, a G memory 34G and a B memory 34B, similarly to the field memory circuit 23, and arranged to receive digitized picture signals in the memories 34R, 34G and 34B through A/D converter 22. However, different from the field memory circuit 23 which is supplied with all output signals of CCD 6, the still image memory circuit 34 is selectively supplied with only motionless picture signals. Namely, rewriting of the data in the still picture memory circuit 34 takes place only when it is detected, from the output signal of one or all of the comparators 32 of the noise reducers 27R, 27G and 27B, that the subject is in a still state or in a negligibly small motion which would not cause color deviations. In this regard, the operation of the still image memory circuit 34 is controlled by a still image control circuit 35, which is supplied with motion signals from the motion detection means 32 of the noise reducers along with enabling signals from the sensor 25. Therefore, when the motion signal is smaller than a predetermined level, the still image control circuit controls the operation of the still image memory circuit 34 to write received RGB picture data in the memories 34R, 34G and 34B according to enabling signals from the sensor 25.

Provided on the input side of the noise reducers 27R, 27G and 27B is a switch means 36 which is constituted by switch elements 36R, 36G and 36B. By simultaneously operating the switch elements 36R, 36G and 36B into motion-picture or freeze display mode position, either the motion-picture video signals from the field memory circuit 23 or the freeze-image signals from the still image memory circuit 34 are selectively produced at the output of the noise reducers 27R, 27G and 27B as output video signal. The operation of the switch means 36 is controlled in response to a freeze signal from a manual operating means (not shown) which is provided, for example, on the casing of a manipulating section of the endoscope. In this regard, a freeze signal from a freeze signal input terminal 37 as well as an enabling signal from the sensor 25 is applied to the still picture control circuit 35 thereby to control write-in and read-out of the memories 34R, 34G and 34B of the still image memory circuit 34 according to the enabling signals.

Further, indicated at 38 is an external memory or storage device such as video tape recorder (VTR), magnetic disk, optical disk or the like, which is adapted to store still image data transferred from a still image output circuit 40 through D/A converters 39R, 39G and 39B every time the still picture data are written in the memories 34R, 34G and 34B of the still image memory circuit 34. Accordingly, the same still picture data as received in the still image memory 34 are simultaneously fed to and recorded on the external storage device 37.

The electronic endoscope of this embodiment operates in the manner as follows.

Firstly, the insert or catheter member 1a of the endoscope is inserted into the patient's body until its tip end confronts a subject to be examined. While irradiating the subject successively with light of R, G and B spectra projected from the light source 10 through the light guide 4 in the illumination light emitting sector 2, the image of the subject is picked up through CCD 6, which sequentially and periodically produces field signals of R, G and B. These RGB field signals are transmitted to the processor 20 to undergo necessary signal processing operations, and successively stored in the field memory circuit 23. Concurrently, the picture data of the RGB fields are read out from the field memory circuit 23 and supplied to the monitor device in the form of simultaneous video signal. In this instance, the output signals of the field memory circuit 23 are passed through the noise reducers 27R, 27G and 27B, respectively, which have the function of sensing relative motions of the subject as described hereinbefore. When the subject is found to be motionless or in a motion of a negligible degree, the value of the coefficient k in the coefficient units 28 and 31 is increased according to the signal from the motion detection means 32 to increase the additive signal component from the one-field delay circuit 30 for noise reduction. On the other hand, in case the subject is found to be in a greater motion, the value of k is minimized to prevent blurring or degradation in definition of the picture.

Even if the processor 20 is operating in the motion-picture display mode, the motion signals from the motion detection means 32, utilizing the motion detecting functions of the noise reducers 27R, 27G and 27B, are sequentially fed to the still image control circuit 35, taking the picture data into the still image memory circuit 34 when the motion signal indicates that the subject is in a still state or in a motion of a negligible degree in terms of obtaining a still picture of satisfactory quality. In this regard, the motion signal for obtaining a still picture may be based, for example, on picture signals of one color G alone as indicated by a solid line in FIG. 1. A still picture of higher quality can be obtained in case arrangements are made to detect a subject motion on the basis of picture signals of all of the three colors as indicated by imaginary lines and to take picture signals into the still image memory circuit 34 only when no motion is detected in picture signals of any color. Every time the still picture data in the still image picture memory 34 is rewritten in this manner, the same picture signal is fed to and recorded in the external memory 38 through D/A converter 39.

When the endoscope is manipulated to select the freeze display mode, a freeze command is supplied to the still image control circuit 35 from the input terminal 37. In response to this input signal, the still image control circuit 35 sends out a signal to the switching means 36 to change the switch elements 36R, 36G and 36B into positions of the still display mode simultaneously. Concurrently, a data renewal inhibiting signal is sent to the respective memories 34R, 34G and 34B of the still memory circuit 34 from the still image control circuit 35 to inhibit renewal of the picture data, and concurrently the contents of these memories are read out and fed to the monitor device after noise reduction through the noise reducers 27R, 27G and 27B to display a freeze-picture image thereon. A hard copy of the freeze-picture image can be obtained in case a hard copy machine is operatively connected.

Thus, upon depressing a freeze button or the like, a freeze-image of a subject of an aimed locality or condition is instantly displayed on the monitor device according to the picture data which had been stored in the still image memory circuit 34 immediately before the manipulation of the freeze button, improving the response of the image freezing operation to a marked degree. In addition, according to the invention, the circuit arrangement of the processor 20 can be simplified significantly since there is no need for providing a motion detecting mechanism exclusively for image freezing purposes. Further, on every renewal of the data in the still image memory circuit 34, the same picture data are automatically sent to and recorded in the external memory 38, which is extremely convenient from the standpoint of management of recorded data because the recorded information in the external memory 38 can be edited into a suitable form after examination or diagnosis.

What is claimed is:

1. A still image control for an electronic endoscope, comprising:

a solid-state image sensor driven by a sequential color scan system;

a motion-picture image processor including a sequential or simultaneous type image memory means to read in and out motion-picture video signals of a subject under observation through said endoscope after processing sequential picture image signals from said solid-state image sensor through predetermined signal processing operations to produce simultaneous motion-picture video signals;

a still image memory means provided in parallel with said motion-picture image memory means to store still picture signals;

a switch means for selectively supplying output signals of said motion-picture image memory means or of said still image memory means to a monitor;

a noise reducer located on the output side of said motion-picture image memory means to reduce noises in said motion-picture video signals on the basis of detection of movement of said subject; and a still image control means adapted to detect motionless video signals on the basis of output signals of said noise reducer and to renew said still-picture data in said still image memory means constantly with motionless video signals.

2. An electronic endoscope as defined in claim 1, wherein said still image control means is arranged to receive a freeze action signal from a manual freeze-operating means and, upon receipt of a freeze action signal, to change said switch means into a freeze mode position to supply picture data in said still image memory means as output signal through said noise reducer.

3. An electronic endoscope as defined in claim 1, wherein said still image memory means is connected to an external memory to record thereon the picture data in said still image memory means on each renewal of said picture data.

* * * * *